United States Patent
Østby

(10) Patent No.: US 10,310,856 B2
(45) Date of Patent: Jun. 4, 2019

(54) DISABLING THREAD EXECUTION WHEN EXECUTING INSTRUCTIONS IN A DATA PROCESSING SYSTEM

(71) Applicant: ARM Limited, Cambridge (GB)

(72) Inventor: Kenneth Edvard Østby, Cambridge (GB)

(73) Assignee: Arm Limited, Cambridge (GB)

( * ) Notice: Subject to any disclaimer, the term of this patent is extended or adjusted under 35 U.S.C. 154(b) by 57 days.

(21) Appl. No.: 15/346,931

(22) Filed: Nov. 9, 2016

(65) Prior Publication Data

US 2018/0129499 A1 May 10, 2018

(51) Int. Cl.
| | | |
|---|---|---|
| G06F 9/00 | (2006.01) | |
| G06F 9/30 | (2018.01) | |
| G06F 9/38 | (2018.01) | |
| G06T 1/20 | (2006.01) | |

(52) U.S. Cl.
CPC ........ G06F 9/30087 (2013.01); G06F 9/3824 (2013.01); G06F 9/3851 (2013.01); G06F 9/3887 (2013.01); G06T 1/20 (2013.01)

(58) Field of Classification Search
CPC .................................................... G06F 9/3009
USPC ......................................................... 345/506
See application file for complete search history.

(56) References Cited

U.S. PATENT DOCUMENTS

| | | | |
|---|---|---|---|
| 2010/0079454 A1 | 4/2010 | Legakis | |
| 2012/0092356 A1 | 4/2012 | Jiao | |
| 2013/0038620 A1 | 2/2013 | Hakura | |
| 2013/0241941 A1 | 9/2013 | Donaldson | |
| 2014/0092091 A1 | 4/2014 | Li | |
| 2014/0327684 A1* | 11/2014 | Engh-Halstvedt | ........ G06T 1/20 345/506 |
| 2014/0354644 A1 | 12/2014 | Nystad | |
| 2015/0054827 A1 | 2/2015 | Hakura | |
| 2015/0091919 A1 | 4/2015 | Nalluri | |
| 2015/0103087 A1 | 4/2015 | Rouet | |
| 2015/0317763 A1* | 11/2015 | Mather | ................. G06T 15/005 345/506 |
| 2016/0049000 A1 | 2/2016 | Patney | |
| 2016/0349832 A1 | 12/2016 | Jiao | |

(Continued)

OTHER PUBLICATIONS

Office Action dated Mar. 8, 2018, U.S. Appl. No. 15/657,014.

(Continued)

*Primary Examiner* — Hai Tao Sun

(74) *Attorney, Agent, or Firm* — Vierra Magen Marcus LLP

(57) ABSTRACT

A program is analyzed to identify instructions that will load external data and to determine whether such instructions are followed by a sequence of instructions that will produce the same result for each thread in a thread group if the data loaded by the load instruction is the same for each thread in the thread group. Each time there is an external load instruction, it is determined whether the data loaded by the external load instruction is the same for all threads of the thread group, and whether the external load instruction was indicated as being followed by a sequence of instructions that produce the same result if the external load instruction loads the same data value for each thread of a thread group. The subsequent instructions are then executed for only a single thread of the thread group, or for all the threads of the thread group.

18 Claims, 9 Drawing Sheets

(56) References Cited

U.S. PATENT DOCUMENTS

2017/0024847 A1   1/2017  Engh-Halstvedt
2017/0024848 A1   1/2017  Harris
2017/0032488 A1   2/2017  Nystad

OTHER PUBLICATIONS

Ostby, "Data Processing Systems," U.S. Appl. No. 15/657,014, filed Jul. 21, 2017.
Notice of Allowance dated Jul. 13, 2018, U.S. Appl. No. 15/657,014.

* cited by examiner

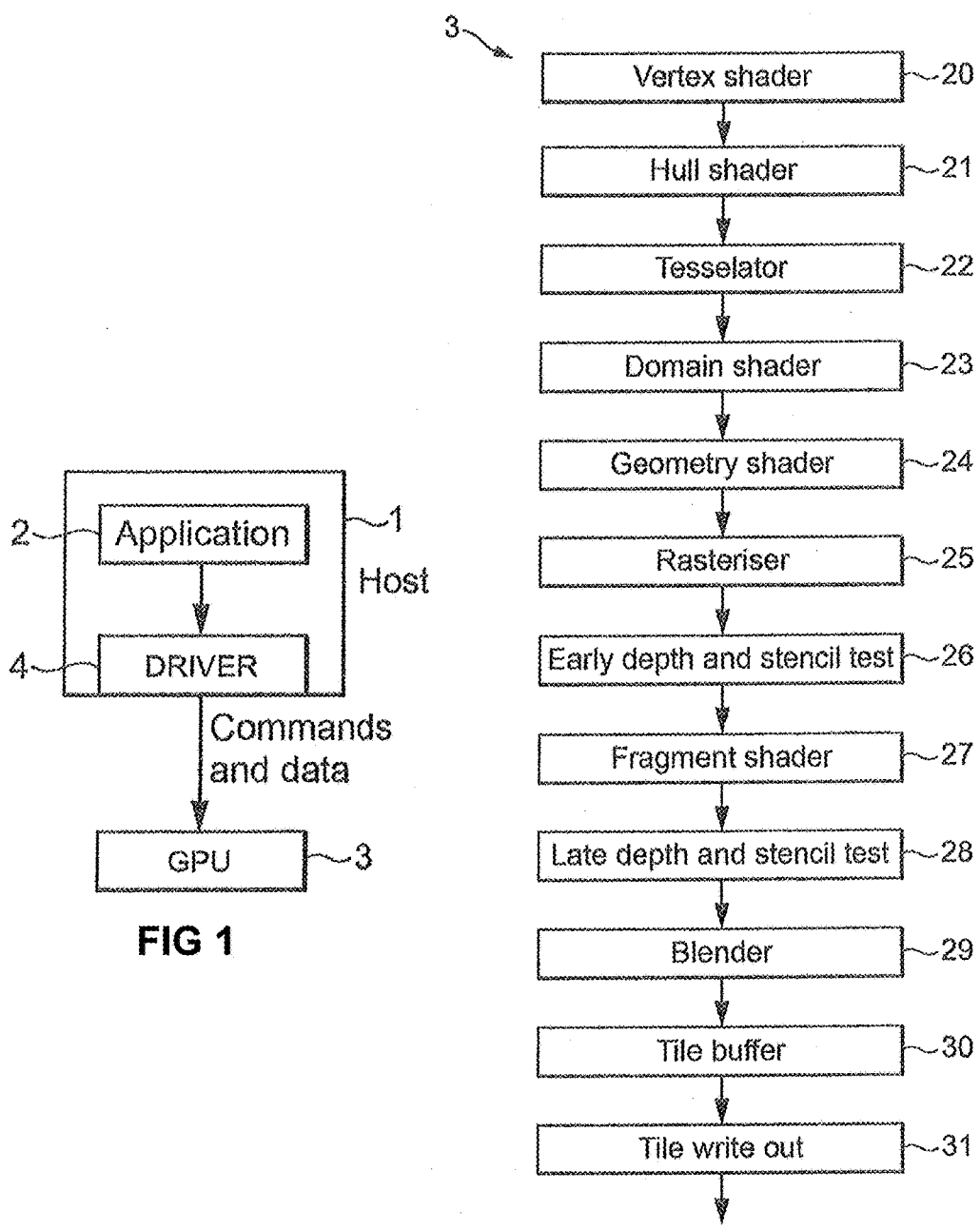

DISABLING THREAD EXECUTION WHEN EXECUTING INSTRUCTIONS IN A DATA PROCESSING SYSTEM

BACKGROUND

The technology described herein relates generally to the operation of a data processing systems that include programmable processing stages, such as a graphics processing system that includes one or more programmable processing stages ("shaders").

Graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a geometry shader, a vertex shader and a fragment (pixel) shader. These shaders are programmable processing stages that execute shader programs on input data values to generate a desired set of output data, for example appropriately shaded and rendered fragment data in the case of a fragment shader, for processing by the rest of the graphics pipeline and/or for output. The shaders of the graphics processing pipeline may share programmable processing circuitry, or they may each be distinct programmable processing units.

A graphics processing unit (GPU) shader core is thus a processing unit that performs graphics processing by running small programs for each graphics item in a graphics output to be generated, such as a render target, e.g. frame (an "item" in this regard is usually a vertex or a sampling position (e.g. in the case of a fragment shader)). This generally enables a high degree of parallelism, in that a typical render output, e.g. frame, features a rather large number of vertices and fragments, each of which can be processed independently.

In graphics shader operation, each "item" will be processed by means of an execution thread which will execute the instructions of the shader program in question for the graphics "item" in question.

A known way to improve shader execution efficiency is to group execution threads (where each thread corresponds, e.g., to one vertex or one sampling position) into "groups" or "bundles" of threads, where the threads of one group are run in lockstep, one instruction at a time. In this way, it is possible to share instruction fetch and scheduling resources between all the threads in the group. Other terms used for such thread groups include "warps" and "wavefronts". For convenience, the term "thread group" will be used herein, but this is intended to encompass all equivalent terms and arrangements, unless otherwise indicated.

The Applicants believe that there remains scope for improvements to the handling of thread groups, particularly in shaders of graphics processing pipelines.

BRIEF DESCRIPTION OF THE DRAWINGS

A number of embodiments of the technology described herein will now be described by way of example only and with reference to the accompanying drawings, in which:

FIG. 1 shows an exemplary graphics processing system;

FIG. 2 shows schematically a graphics processing pipeline that can be operated in the manner of the technology described herein;

FIGS. 5 and 6 show schematically the execution of an exemplary program in an embodiment of the technology described herein;

Like reference numerals are used for like components where appropriate in the drawings.

DETAILED DESCRIPTION

Figure 3:
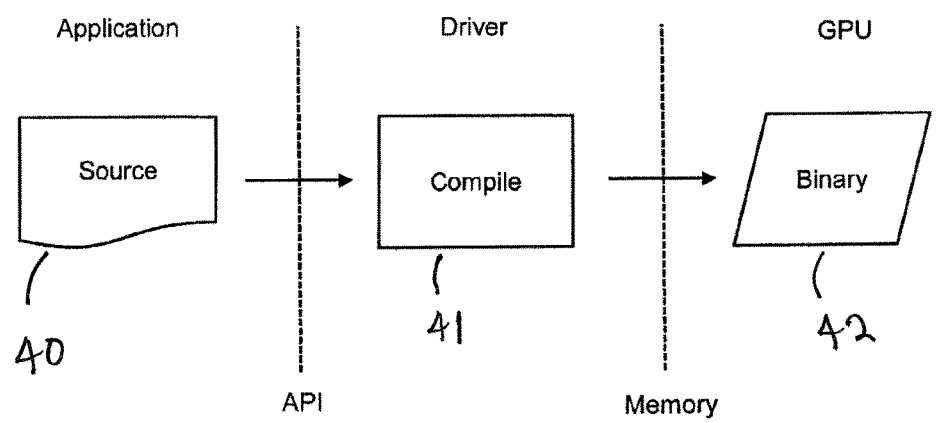
FIG. 3 shows schematically the compiling of a shader program for execution by a graphics processing pipeline.

An embodiment of the technology described herein comprises a method of operating a data processing system which includes a programmable processing stage that executes instructions to perform processing operations, in which execution threads may be grouped together into thread groups in which the plural threads of a thread group can each execute a set of instructions in lockstep, one instruction at a time;

the method comprising:

for a program comprising a set of instructions for execution by a programmable processing stage of the data processing system:

identifying an instruction in the set of instructions that will obtain external input data from a source that is external to the programmable processing stage; and determining whether the instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data; and when it is determined that an instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data:

associating with the instruction that will obtain external input data from a source that is external to the programmable processing stage an indication that it is followed by is followed by one or more subsequent instructions that will use the external data and that would produce the same result for plural threads of a thread group were those plural threads each to execute the one or more subsequent instructions using the same external input data; the method further comprising:

the programmable processing stage:

receiving the set of instructions for execution by the programmable processing stage; and executing the set of instructions for a thread group comprising plural execution threads;

the executing the set of instructions for the thread group comprising:

for an instruction that will obtain external input data from a source that is external to the programmable processing stage:

executing the instruction for each thread of the thread group to obtain external input data for each thread of the thread group;

determining whether the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data; and determining whether the obtained external input data is the same for plural threads of the thread group; and when it is determined that the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is not the same for plural threads of the thread group:

executing the one or more subsequent instructions that will use the external data and that would produce the same result for plural threads of a thread group were those plural threads each to execute the one or more subsequent instructions using the same external input data, for each of the plural threads of the thread group individually;

when it is determined the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is the same for plural threads of the thread group:

executing the one or more subsequent instructions that will use the external data and that would produce the same result for plural threads of a thread group were those plural threads each to execute the one or more subsequent instructions using the same external input data, for only a single thread of the plural threads.

Another embodiment of the technology described herein comprises a data processing system, comprising:

a programmable processing stage comprising programmable processing circuitry that executes program instructions to perform processing operations, in which execution threads may be grouped together into thread groups in which the plural threads of a thread group can each execute a set of instructions in lockstep, one instruction at a time;

the data processing system further comprising:

processing circuitry configured to, for a program comprising a set of instructions for execution by the programmable processing stage of the data processing system:

identify an instruction in the set of instructions that will obtain external input data from a source that is external to the programmable processing stage; and determine whether the instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data; and when it is determined that an instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data:

associate with the instruction that will obtain external input data from a source that is external to the programmable processing stage an indication that it is followed by is followed by one or more subsequent instructions that will use the external data and that would produce the same result for plural threads of a thread group were those plural threads each to execute the one or more subsequent instructions using the same external input data; and the programmable processing stage further comprising processing circuitry configured to:

receive a set of instructions for execution by the programmable processing stage; and execute the set of instructions for a thread group comprising plural execution threads;

the executing the set of instructions for the thread group comprising:

for an instruction that will obtain external input data from a source that is external to the programmable processing stage:

executing the instruction for each thread of the thread group to obtain external input data for each thread of the thread group;

determining whether the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data; and determining whether the obtained external input data is the same for plural threads of the thread group; and when it is determined that the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is not the same for plural threads of the thread group:

executing the one or more subsequent instructions that will use the external data and that would produce the same result for plural threads of a thread group were those plural threads each to execute the one or more subsequent instructions using the same external input data, for each of the plural threads of the thread group individually;

when it is determined the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is the same for plural threads of the thread group:

executing the one or more subsequent instructions that will use the external data and that would produce the same result for plural threads of a thread group were those plural threads each to execute the one or more subsequent instructions using the same external input data, for only a single thread of the plural threads.

The technology described herein relates to the execution of a set of instructions for a program in which threads that are to execute the set of instructions may be grouped together into a thread group ("warp"). In the technology described herein, plural threads of the thread group can each execute the set of instructions or, in selected cases, a single thread can execute one or more identified instructions on behalf of the plural threads. Selectively executing a single thread in this way can, for example, reduce the overall processing that is required by reducing the number of threads that need to be executed by the programmable processing stage when plural threads are to be executed.

The Applicants have recognised that programs to be executed may include instructions that load data from external sources (that cause "side effects") and that the input data provided by sources external to the programmable processing stage can often be the same for plural threads of a thread group, and that the particular instructions that provide such data can be identified and indicated in advance. For example, in graphics data processing systems, externally provided colour (e.g. RGB), transparency ($\alpha$), depth, texture co-ordinate, etc., values are often the same for plural threads of a thread group. The Applicants have further recognised that some sequences of subsequent instructions can produce the same result for plural threads of a thread group where those plural threads each execute that sequence of instructions using the same input data, and that such sequences of instructions can be identified and indicated in advance.

The technology described herein exploits this by identifying and then indicating to a programmable processing stage a sequence of instructions that comprises an instruction that will obtain external input data from a source that is external to the programmable processing stage and one or more subsequent instructions that will use the external data and that would produce the same result for plural threads of a thread group were those plural threads each to execute the one or more subsequent instructions using the same external input data.

The programmable processing stage can then execute plural threads of a thread group with each of the plural threads executing the instruction to obtain external input data and then determine whether the so-obtained external input data is the same for the plural threads. If it is determined that the external input data is the same for those threads, then a single thread can execute the one or more subsequent instructions on behalf of the plural threads. As discussed above, executing a single thread in this way can have the effect of reducing the overall processing that is required by reducing the number of threads that need to be executed when plural threads are to be executed.

Furthermore, since the technology described herein operates by determining whether external data values that are to be loaded are the same or not, and identifies and indicates to the programmable processing stage a suitable sequence of instructions in advance, that avoids the need, for example, to try to identify thread "disabling" opportunities by reading data from the register file (the registers associated with the threads) and comparing it, to then try to identify threads that do not need to be executed. The technology described herein can accordingly reduce the amount of processing that the programmable processing stage needs to perform in order to identify opportunities to reduce the number of threads that are executed, as compared, for example, to techniques that constantly check the register files to see if their values are the same, thus reducing timing and power consumption.

Also, because it is the external data that is being returned that is determined whether it is the same or not in the operation of the technology described herein, that determination can be performed and live outside of the critical thread execution path in the programmable processing unit, thereby again reducing timing and power consumption.

The data processing system can be any desired and suitable system in which threads would typically be processed together in thread groups. In embodiments, the data processing system is a graphics processing system.

Correspondingly, the programmable processing stage can comprise any suitable and desired programmable processing stage of a data processing system. In the case of graphics processing, the programmable processing stage in an embodiment comprises a programmable shading stage (shader). The programmable processing stage may, for example, operate as a programmable geometry shading stage (geometry shader), a programmable vertex shading stage (vertex shader) or a programmable fragment shading stage (fragment shader). It will be appreciated that the programmable processing stage may operate solely as a particular type of processing stage at any given time, but may be able to operate as one or more other types of processing stage at other times (e.g. depending upon how it is programmed).

The programmable processing stage can be implemented as desired and in any suitable manner. The programmable processing stage may comprise any suitable programmable hardware element such as programmable processing circuitry. It in an embodiment comprises (is implemented as) a (programmable) execution unit of the data processor (e.g. graphics processor) in question.

The programmable processing stage can form part of a processing pipeline, such as a graphics processing pipeline. The processing pipeline may comprise plural programmable processing stages. Each programmable processing stage may be provided as a separate circuit element to other programmable stages of a processing pipeline or the programmable processing stages may share some or all of their programmable processing circuitry (that is then differently programmed to serve as the desired programmable processing stage).

As well as any programmable processing stages, the processing pipeline may also contain any other suitable and desired processing stages that a processing pipeline may contain. For example, in the case of graphics processing, the graphics processing pipeline may contain one or more or all of a rasteriser, an early depth (or an early depth and stencil) tester, a late depth (or depth and stencil) tester, a blender, a tile buffer, a write out unit, etc.

The operation in the manner of the technology described herein may be performed by each and every program or programmable processing stage of the processing pipeline or only for particular categories or types of program or programmable processing stage but not for other categories or types of program or programmable processing stage (e.g. where the type of program or programmable processing stage is unlikely to offer useful opportunities to use a single thread on behalf of plural threads).

The program that is being executed can be any suitable and desired set of instructions that would typically be executed by plural threads of a thread group. In embodiments, the program may be a shader program. The program may be, for example, a geometry shader program (a program for executing geometry shading operations), a vertex shader program (a program for executing vertex shading operations) or a fragment shader program (a program for executing fragment shading operations).

Similarly, the set of instructions can be any desired and suitable instructions that would typically be executed by plural threads of a thread group. The set of instructions may comprise, for example, one or more, mathematical operations (add, subtract, multiply, divide, etc.), bit manipulations (invert, swap, shift, etc.), logic operations (AND, OR, NAND, NOR, NOT, XOR, etc.), load instructions, store instructions, constants, variables, etc.

The instruction that will obtain external input data from a source that is external to the programmable processing stage may be any suitable and desired instruction that will obtain external input data for use by subsequent instructions. In an embodiment, it is an instruction that has a "side effect", namely that goes outside of the programmable processing unit to return data to be written into the register files (the registers) for the threads that the programmable processing unit is executing.

The one or more subsequent instructions in the identified sequence of instructions may comprise any suitable instructions that will use the external data and that would produce the same result for plural threads of a thread group were those plural threads each to execute the one or more subsequent instructions using the same external input data. Thus they may, e.g., comprise arithmetic and store operations. They may also, e.g., comprise an external load instruction where each thread reads (is guaranteed to read) the same address (on the assumption that reading the same address will return the same data) (but this cannot be assumed for loads that read different addresses, as that cannot be guaranteed to provide the same result for the plural threads).

On the other hand, an instruction that is dependent on a variable particular to a thread, such as an execution lane identification number for an execution lane that is being used to execute a particular thread, cannot be considered as producing the same result for plural threads, since it may not provide the same result for the plural threads.

Identifying the sequence of instructions of the set of instructions can take any desired and suitable form. In embodiments, the program (source code) that is provided, e.g. by an application on a host processor that requires the data processing is analysed, e.g., and in an embodiment by a compiler (e.g. shader compiler), to determine whether there is a suitable sequence of instructions and, when a suitable sequence of instructions is identified, provide the indication. In embodiments, the, e.g. compiler, may also re-order instructions in the set of instructions so as to, for example, provide a suitable sequence of instructions and/or so as to provide a more efficient (e.g. longer) sequence of instructions.

The, e.g., compiler, may, e.g., look at the dependencies of instructions in the set of instructions, the results that instructions will generate and the inputs (operands) that they will use, etc., in order to identify suitable sequences of instructions for operation in the manner of the technology described herein. The, e.g., compiler, may use any suitable and desired technique and process in order to identify suitable sequences of instructions in a set of instructions in a program to be executed for operation in the manner of the technology described herein.

The, e.g., compiler, may run on a host processor of the data processing system. The programmable processing stage may form part of another processor, such as a graphics processor, that is associated with the host processor, such that the compiler and compiled program run on separate processors of the overall data graphics processing system. However, other arrangements would be possible, such as the compiler running on the same processor as the compiled program, or the compiler being run on a (completely) separate processor, such as the program being precompiled on a separate system and being distributed in a compiled form.

The technology described herein also extends to the operation of a complier for the data processing system.

Thus, another embodiment of the technology described herein comprises a method of compiling a program to generate instructions for a programmable processing stage of a data processing system that executes instructions to perform processing operations, and in which execution threads may be grouped together into thread groups in which the plural threads of a thread group can each execute a set of instructions in lockstep, one instruction at a time;

the method comprising:

for a program comprising a set of instructions for execution by a programmable processing stage of a data processing system:

identifying an instruction in the set of instructions that will obtain external input data from a source that is external to the programmable processing stage; and determining whether the instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data; and when it is determined that an instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data:

associating with the instruction that will obtain external input data from a source that is external to the programmable processing stage an indication that it is followed by is followed by one or more subsequent instructions that will use the external data and that would produce the same result for plural threads of a thread group were those plural threads each to execute the one or more subsequent instructions using the same external input data.

Another embodiment of the technology described herein comprises a compiler that compiles programs to generate instructions for a programmable processing stage of a data processing system that executes instructions to perform processing operations, and in which execution threads may be grouped together into thread groups in which the plural threads of a thread group can each execute a set of instructions in lockstep, one instruction at a time;

wherein the compiler is configured to, when compiling a program to generate a set of instructions for execution by a programmable processing stage of a data processing system:

identify an instruction in the set of instructions that will obtain external input data from a source that is external to the programmable processing stage; and determine whether the instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data; and when it is determined that an instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data:

associate with the instruction that will obtain external input data from a source that is external to the programmable processing stage an indication that it is followed by is followed by one or more subsequent instructions that will use the external data and that would produce the same result for plural threads of a thread group were those plural threads each to execute the one or more subsequent instructions using the same external input data.

As will be appreciated by those skilled in the art, these embodiments of the technology described herein can, and in an embodiment do, include any one or more or all of the features of the technology described herein described herein, as appropriate.

The indication of an external load ("side effect") instruction that is followed by one or more subsequent instructions that will use the external data and that would produce the same result for plural threads of a thread group were those plural threads each to execute the one or more subsequent instructions using the same external input data can take any desired and suitable form that can indicate (and be used by the programmable processing stage to identify) the potential opportunity to use a single thread. In embodiments, the indication is provided as or as part of an instruction in the set of instructions. The indication may, for example, be an instruction prior to the particular load ("side effect") instruction, or a modified version of the particular load ("side effect") instruction. For example, and in an embodiment, a flag (bit) may be associated with a or each instruction and set to provide the indication (or not). In other embodiments, the indication may be a parameter provided separately from the set of instructions, such as a pointer to the instruction or a counter that counts down the number of instructions it takes to reach the particular load instruction when executing the set of instructions.

The indication can be provided in any suitable and desired manner. In embodiments, the, e.g. compiler, may, for example, insert an indication instruction or provided a modified version of the particular load instruction at the appropriate point in the set of instructions, or otherwise generate a particular number of instructions it takes to reach the particular instruction when executing the set of instructions.

The thread group that is considered in the manner of the technology described herein can be any suitable and desired size. In embodiments, the thread group contains four threads (i.e. there is a warp width of four). However, other arrangements, such as the use of wider thread groups (warps) would be possible, if desired. In embodiments, each thread group (warp) may correspond to a sampling "item" (e.g. a fragment), such as a 2×2 sampling item ("quad") or other sized sampling item. Thus, the threads of the thread group may relate to respective sample points or sampling positions that are to be subjected to per-sample processing operations.

The plural threads of the thread group that are executed in the manner of the technology described herein can also be any desired and suitable size. In embodiments, the plural threads may be all of the threads of the thread group. For example, it may be determined that the external input data is the same for all of the threads of the thread group. In this case, the single thread may be executed on behalf of all of the threads of the thread group. In other embodiments, the plural threads may be some but not all of the threads of the thread group. For example, it may be determined that the external input data is the same for some but not all of the threads of the thread group. In this case, the single thread may be executed on behalf of some but not all of the threads of the thread group. One or more further threads may be executed on behalf of the remaining threads of the thread group. Appropriate, e.g., state, information may be maintained to track and indicate which threads are sharing execution and which threads are being executed individually.

Determining whether the external input data is the same for the plural threads may be performed in any desired and suitable way. In embodiments, the external input data for the plural threads is compared, for example using suitable logic such as one or more comparators. For example, external input data for pairs of threads of the thread group may be compared to each other to produce a binary result for each pair (e.g. "1" where the external input data is the same for the pair or "0" where the external input data is not the same for the pair). The binary result of the comparison for the pairs may then be compared to each other to produce a binary result for plural pairs of threads of the thread group (e.g. "1" where the external input data is the same for the thread pairs or "0" where the external input data is not the same for the thread pairs), and so on, e.g., until a result for all the threads of the group is reached.

For an external load ("side effect") instruction that is indicated as being followed by one or more instructions that will produce the same result for each thread in a thread group if the external input data that is loaded for each thread is the same, then, as discussed above, depending on whether the external input data is the same for plural threads or not, either the one or more subsequent instructions of the sequence of instructions is executed for each of the plural threads individually, or the one or more subsequent instructions of the identified sequence of instructions are executed for only a single thread of the plural threads.

Where only a single thread is to execute the subsequent instructions, then the execution of the other threads in the plural threads is in an embodiment stalled (disabled) after the load ("side effect") instruction, so that those threads do not execute the one or more subsequent instructions. This can be achieved in any suitable and desired manner, e.g. depending upon the nature of the programmable processing stage in question. In an embodiment appropriate, e.g. state, information is maintained to track and indicate which thread or threads of the thread group are active, and which threads of the thread group are inactive (disabled), and/or, e.g., which threads are sharing execution. This tracking information can be maintained in any suitable and desired manner, for example in an appropriate state table.

As will be appreciated, executing the one or more subsequent instructions of the identified sequence of instructions for each of the plural threads individually should, and in an embodiment does, generate a (separate) result for each of the plural threads (i.e. will generate plural results). These results would normally be different to each other, but it could still be the case that two or more of these results are the same. However, there will still be plural results generated, one for each of the plural threads.

Correspondingly, when the one or more subsequent instructions are executed for only a single thread of the plural threads, then that should, and in an embodiment does, generate only a single result for the plural threads (i.e. for the single thread for which the subsequent instructions are executed on behalf of the plural threads).

The result or results generated by executing the one or more subsequent instructions may be used as desired. For example, they may be output, e.g. to external memory, and/or they may be provided for, and used by, further instructions in the set of instructions (in the program) being executed by the programmable processing stage.

In all cases, the result(s) may be used by the data processing system to generate an output. The output that is generated by the data processing system can be any suitable and desired output, such as a render output. In embodiments, the output may be a frame (image) to be displayed, a texture (in a render-to-texture operation), etc.

The technology described herein also extends to the operation of the programmable processing stage (unit) of the data processing system.

Thus, another embodiment of the technology described herein comprises a method of operating a programmable processing stage of a data processing system that executes instructions to perform processing operations, and in which execution threads may be grouped together into thread groups in which the plural threads of a thread group can each execute a set of instructions in lockstep, one instruction at a time;

the method comprising:
the programmable processing stage:
receiving a set of instructions for execution; and
executing the set of instructions for a thread group comprising plural execution threads;
the executing the set of instructions for the thread group comprising:
for an instruction that will obtain external input data from a source that is external to the programmable processing stage:
executing the instruction for each thread of the thread group to obtain external input data for each thread of the thread group;

determining whether the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data; and determining whether the obtained external input data is the same for plural threads of the thread group; and when it is determined that the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is not the same for plural threads of the thread group:

executing the one or more subsequent instructions that will use the external data and that would produce the same result for plural threads of a thread group were those plural threads each to execute the one or more subsequent instructions using the same external input data, for each of the plural threads of the thread group individually;

when it is determined the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is the same for plural threads of the thread group:

executing the one or more subsequent instructions that will use the external data and that would produce the same result for plural threads of a thread group were those plural threads each to execute the one or more subsequent instructions using the same external input data, for only a single thread of the plural threads.

Another embodiment of the technology described herein comprises a programmable processing stage for a data processing system stage that executes instructions to perform processing operations, and in which execution threads may be grouped together into thread groups in which the plural threads of a thread group can each execute a set of instructions in lockstep, one instruction at a time;

the programmable processing stage comprising processing circuitry configured to:
receive a set of instructions for execution; and
execute the set of instructions for a thread group comprising plural execution threads;
the executing the set of instructions for the thread group comprising:
for an instruction that will obtain external input data from a source that is external to the programmable processing stage:
executing the instruction for each thread of the thread group to obtain external input data for each thread of the thread group;

determining whether the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data; and determining whether the obtained external input data is the same for plural threads of the thread group; and when it is determined that the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is not the same for plural threads of the thread group:

executing the one or more subsequent instructions that will use the external data and that would produce the same result for plural threads of a thread group were those plural threads each to execute the one or more subsequent instructions using the same external input data, for each of the plural threads of the thread group individually;

when it is determined the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is the same for plural threads of the thread group:

executing the one or more subsequent instructions that will use the external data and that would produce the same result for plural threads of a thread group were those plural threads each to execute the one or more subsequent instructions using the same external input data, for only a single thread of the plural threads.

As will be appreciated by those skilled in the art, these embodiments of the technology described herein can, and in an embodiment do, include any one or more or all of the features of the technology described herein described herein, as appropriate.

It will be appreciated that the set of instructions for the program being executed by the programmable processing stage may comprise more instructions than an external load ("side effect") instruction and a subsequent sequence of one or more instructions. Other instructions in the set of instructions can be, and are in an embodiment, executed in the appropriate manner, e.g. for each thread individually.

It may also be the case that there is more than one sequence of instructions comprising an external load instruction that will obtain external input data and one or more subsequent instructions that will use that external data and will produce the same result if that external input data is the same. In this case, in an embodiment plural and in an embodiment each, of such sequences of instructions are identified and flagged for operation in the manner of the technology described herein. Thus, the operation, etc., in the manner of the technology described herein may be repeated for plural identified sequences of instructions comprising a particular instruction that will obtain external input data and one or more subsequent instructions that will use that external data and produce the same result if that external input data is the same for each of plural threads.

It may also be the case that there may be a sequence or sequences of instructions in the set of instructions to be executed comprising an external load ("side effect") instruction that will obtain external input data and one or more subsequent instructions that will use the external data, but which cannot be guaranteed to produce the same result if the external input data is the same (i.e. could or will produce a different result for each thread in a thread group, even if the external input data is the same).

In an embodiment such sequences of instructions are also identified and flagged so as to control the operation of the programmable processing stage appropriately when executing such sequences of instructions. This is in an embodiment done for at least one such sequence of instructions, but in an embodiment for plural and, in an embodiment for each, of such sequences of instructions that are in the set of instructions (program) to be executed. Again, in an embodiment appropriate metadata is set to indicate such an external load instruction followed by one or more subsequent instructions that may not produce the same result for each thread of a thread group even if the external input data is the same.

Thus, in an embodiment, the method of the technology described herein further comprises (and the data system comprises processing circuitry configured to):

for a program comprising a set of instructions for execution by a programmable processing stage of a data processing system:

identifying an instruction in the set of instructions that will obtain external input data from a source that is external to the programmable processing stage; and determining whether the instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data; and when it is determined that an instruction that will obtain external input data from a source that is external to the programmable processing stage is not (is other than) followed by one or more subsequent instructions that will use the external data and that would produce the same result for plural threads of a thread group were those plural threads each to execute the one or more subsequent instructions using the same external input data:

associating with the instruction that will obtain external input data from a source that is external to the programmable processing stage an indication that it is followed by is followed by one or more subsequent instructions that will use the external data and that may not produce the same result for plural threads of a thread group were those plural threads each to execute the one or more subsequent instructions using the same external input data.

Correspondingly, in an embodiment, the method of the technology described herein further comprises the programmable processing stage (and the programmable processing stage is further configured to):

when executing a set of instructions for a thread group comprising plural execution threads, for an instruction that will obtain external input data from a source that is external to the programmable processing stage:

executing the instruction for each thread of the thread group to obtain external input data for each thread of the thread group;

determining whether the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data; and when it is determined that the instruction that will obtain external input data from a source that is external to the programmable processing stage does not have associated with it an indication that it is followed by one or more subsequent instructions that will use the external data and that would produce the same result for plural threads of a thread group were those plural threads each to execute the one or more subsequent instructions using the same external input data:

executing the one or more subsequent instructions that will use the external data for each of the plural threads of the thread group individually.

It may also be the case that a sequence of instructions comprising an external load ("side effect") instruction that will obtain external input data followed by one or more subsequent instructions that will use that external data that has been executed using a single thread for a group of plural threads, is then followed by one or more instructions in the set of instructions that should be executed for each thread in the thread group individually. This may be indicated, e.g., by, as discussed above, associating an appropriate indication (e.g. metadata) with a subsequent instruction, e.g. external load, in the set of instructions that follows the external load instruction and the one or more subsequent instructions that will produce the same result if the external input data is the same.

In this case, the result of the single thread that executed the one or more subsequent instructions is in an embodiment provided to each of the plural threads in the group, so that those plural threads can then use the result of the execution of the one or more subsequent instructions for their further instruction execution. The result of executing the one or more instructions using a single thread for plural threads of a thread group can be distributed to the plural threads of the group for use in any suitable and desired manner. In an embodiment this is done by writing the appropriate value into storage, such as a register, associated with (for) each respective thread.

Thus, in an embodiment, the method of the technology described herein further comprises the programmable processing stage (and the programmable processing stage is further configured to) when it has executed one or more instructions that will use external data for only a single thread of plural threads of a thread group, for the next instruction in the set of instructions that will obtain external input data from a source that is external to the programmable processing stage:

determining whether that instruction that will obtain external input data from a source that is external to the programmable processing stage has associated with it an indication that is followed by one or more subsequent instructions that will use the external data and that would produce the same result for plural threads of a thread group were those plural threads each to execute the one or more subsequent instructions using the same external input data; and when it is determined that the instruction that will obtain external input data from a source that is external to the programmable processing stage does not have associated with it an indication that is followed by one or more subsequent instructions that will use the external data and that would produce the same result for plural threads of a thread group were those plural threads each to execute the one or more subsequent instructions using the same external input data:

providing the result of the execution of the one or more instructions for only a single thread of the plural threads to the plural threads of the thread group; and executing the one or more subsequent instructions that will use the external data for each of the threads of the thread group individually, using the result from the execution of the single thread.

The process may then be repeated the next time an instruction that will obtain input data from a source external to the programmable processing stage is encountered, and so on.

Thus, in an embodiment, each time an instruction that will obtain external input data from a source that is external to the programmable processing stage is encountered in the set of instructions being executed for a thread group, it is determined whether that instruction has associated with it an indication that it is followed by one or more subsequent instructions that will use the external data and that would produce the same result for plural threads of a thread group were those plural threads each to execute the one or more subsequent instructions using the same external input data, or not, and then either the one or more subsequent instructions are executed for each of the threads of the thread group individually, or for only a single thread of plural threads of the thread group, accordingly.

Correspondingly, where instructions have been executed using a single thread only on behalf of plural threads of a thread group, the result of that execution is in an embodiment distributed to the plural threads of the group when an instruction that will obtain external input data from a source that is external to the programmable processing stage that does not have associated with it an indication that it is followed by one or more subsequent instructions that will use the external data and that will produce the same result for plural threads of a thread group were those plural threads each to execute the one or more subsequent instructions using the same external input data is encountered in the set of instructions being executed.

Operation in the manner of the technology described herein may be controlled in any desired and suitable way.

In an embodiment metadata, such as a flag, is provided for each instruction in the set of instructions (in the program) to be executed that obtains external data, which can be set to a first, particular, value (e.g. "1") to indicate that the instruction in question precedes a sequence of one or more instructions that will use the external data and that would produce the same result for plural threads of a thread group were those plural threads each to execute the one or more subsequent instructions using the same external input data, and which can be set to a second, different particular, value (e.g. "0") to indicate that the instruction in question precedes a sequence of one or more instructions that will use the external data but that may (would) not produce the same result for plural threads of a thread group were those plural threads each to execute the one or more subsequent instructions using the same external input data.

This metadata may be recorded, for example, in a table, such as a transaction state table, that comprises an entry for each instruction of the set of instructions that is obtaining external input data.

In an embodiment, the indication is provided in a table that stores for one or more, and in an embodiment plural, and in an embodiment for all of the, external load ("side effect") instructions in the set of instructions (program) that have been issued by the programmable processing stage to obtain external input data an indication of whether the, and in an embodiment each such, instruction is followed by a sequence of instructions that will use the external data uploaded by the load instruction in question and that will produce the same result for plural threads of a thread group when those threads execute the one or more subsequent instructions using the same external input data or not.

In this case, the "external load" ("side effect") instruction metadata, e.g. in the transaction state table, and the input data values comparison result may be and are in an embodiment used (e.g. subjected to an AND operation) to select (determine) whether to execute the plural threads individually or to execute a single thread on behalf of the plural threads. For example, when the metadata (e.g. flag) indicates that the load instruction in question is followed by a sequence of one or more instructions that will use the external data and that would produce the same result for plural threads of a thread group were those plural threads each to execute the one or more subsequent instructions using the same external input data and the data values comparison result indicates that the external input data for the plural threads is the same, a single thread may be used to execute the one or more subsequent instructions on behalf of the plural threads. Otherwise, the plural threads may execute the one or more subsequent instructions.

In embodiments, the "external load" ("side effect") metadata may be, and is in an embodiment, used to select whether to determine that the external input data is the same for the plural threads in the first place (i.e. to decide whether or not to compare the external input data for the plural threads at all). This may help to reduce power consumption by avoiding data comparisons where it is known that that would not be beneficial.

In an embodiment, the operation in the manner of the technology described herein is also or instead at least in part controlled on the basis of, and by using, metadata (e.g. a flag) associated with a thread group (and in an embodiment with each thread group that is being executed). In this case, metadata for the thread group may be set to indicate whether the thread group should execute instructions separately for the threads of the thread group, or should execute instructions for (using) only a single thread (on behalf of the plural threads of the thread group). This metadata may be stored, e.g., in a suitable table, such as a thread group state table, that includes an entry for each thread group that the program (set of instructions) is to be executed for.

In this case, when an instruction that loads external data is executed and it is determined in the manner of the technology described herein that subsequent instructions should be executed using a single thread only, the thread group metadata (state information) could be set to indicate that for that thread group, instructions are to be executed for a single thread only (and vice-versa), with the process then checking that state information each time an instruction is to be executed, to determine whether the instruction should be executed for (using) a single thread only, or should be executed for (using) plural threads.

This thread group "single" or "plural" execution state information can be, and is in an embodiment, updated appropriately each time an external load instruction is encountered, e.g., and in an embodiment, depending upon whether the instruction has an associated indication that it heads a sequence of instructions that would produce the same result for plural threads of a thread group were those plural threads each to execute the instructions using the same external input data or not, and, if appropriate, the result of the determination of whether the external input data is the same for the plural threads.

The technology described herein can be used for all forms of output that a processing pipeline may be used to generate. For example, in the case of graphics processing, the graphics processing pipeline may generate frames for display, render-to-texture outputs, etc. The output, e.g. fragment shaded, data values from the processing are in an embodiment exported to external, e.g. main, memory, for storage and use, such as to a frame buffer for a display.

In some embodiments, the data processing system comprises, and/or is in communication with, one or more memories and/or memory devices that store the data described herein, and/or store software for performing the processes described herein. The data processing system may also comprise or be in communication with a host microprocessor, and/or with a display for displaying images based on the data generated by the data processing system.

The technology described herein is applicable to any suitable form or configuration of processor or data processing system. It is particularly applicable to tile-based graphics processors and graphics processing systems. Thus in an embodiment, the data processing system and processing pipeline are a tile-based graphics processing system and pipeline, respectively.

In an embodiment, the various functions of the technology described herein are carried out on a single data processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the data processing system and pipeline can otherwise include any one or more or all of the usual functional units, etc., that data processing systems and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display. However, it will be appreciated that the techniques for handling groups of execution threads described herein can be used in other non-graphics contexts in which groups of threads are used.

FIG. 1 shows a typical graphics processing system. An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 3 of the present embodiment in more detail.

The graphics processing pipeline 3 shown in FIG. 2 is a tile-based renderer and will thus produce tiles of a render output data array, such as an output frame to be generated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. The tile buffer stores colour and depth buffers that store an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). The display device could comprise, e.g., a display comprising an array of pixels, such as a computer monitor or a printer.

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 3 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include the creation of one or more intermediate representations of the program within the compiler. The compiler may, e.g., be part of the driver 4, with there being a special API call to cause the compiler to run. The compiler execution can thus be seen as being part of the draw call preparation done by the driver in response to API calls generated by an application.

FIG. 3 illustrates this, and shows the shader program being provided in the high level shader programming language 40 by the application 2 to the driver 4, which then compiles 41 the shader program to the binary code 42 for the graphics processing pipeline 3.

As discussed above, each shader in the graphics processing pipeline is a processing unit that performs graphics processing by running small programs for each graphics item in a graphics output to be generated (an "item" in this regard is usually a vertex, a fragment or a pixel), and is implemented as appropriate programmable processing circuitry. The present embodiments relate to the situation where threads to be executed by a shader (where each thread corresponds to one graphics item) have been organised into a "group" or "bundle" of threads that are to be run in lockstep, one instruction at a time.

Embodiments of the technology described herein will now be described with reference in particular to operations of the fragment shader 27 of the graphics processing pipeline. However, the following processes could be appropriately modified and used by any one or more or all of the programmable processing stages.

In the fragment shader 27, the fragment shading program that is being executed is run once for each sampling position (or point) that is to be processed, with one execution thread being spawned for each sampling position. Typically, the sampling positions (and thus accordingly their corresponding execution threads) are organised into and processed as groups of plural sampling positions (and thus threads). In the present embodiments, the sampling positions are organised into 2×2 "quads", and are correspondingly processed in the fragment shader as thread groups or "warps" containing four threads, each corresponding to one of the sampling positions of the "quad". The group of threads representing a given sampling position quad is then run in lockstep, one instruction at a time, through the fragment shader.

In the present embodiments, a shader program (set of instructions) to be executed is analysed to identify instructions that will load external data and also to determine whether such instructions are followed by a sequence of one or more instructions that will produce the same result for each thread in a thread group if the data loaded by the load instruction is the same for each thread in the thread group. The load instructions are then flagged as either being followed by a sequence of instructions that will produce the same result if the externally loaded data is the same for each thread in the thread group, or as being followed by a sequence of instructions that may not produce the same result even if the externally loaded data is the same for each thread in a thread group.

In the present embodiments, the flag that indicates whether a load instruction is followed by a sequence of instructions that will produce the same result if the externally loaded data is the same for each thread in the thread group or not will be referred to for convenience as a "matching bit" which can be set for a load instruction if it is followed by a sequence of instructions that will produce the same result if the externally loaded data is the same for each thread in a thread group, or cleared if the load instruction is followed by a sequence of instructions that may not produce the same result even if the externally loaded data is the same for each thread in a thread group.

Once the shader program has been prepared in this way, then when it is being executed by the shader in question, each time there is an external load instruction in the shader program, it is determined whether the data loaded by the external load instruction is the same for all threads of the thread group in question, and whether the external load instruction was indicated as being followed by a sequence of instructions that will produce the same result if the external load instruction loads the same data value for each thread of a thread group or not.

In the event that the external load instruction is indicated as being followed by one or more instructions that will produce the same result if the externally loaded data is the same for each thread of a thread group, and it is determined that the externally loaded data is the same for each thread of the thread group, then the subsequent instructions are executed for only a single thread of the thread group, to thereby fetch and execute those instructions and produce a single result for those instructions for all the threads of the thread group.

On the other hand, if the external load instruction is not indicated as being followed by one or more instructions that will produce the same result if the externally loaded data is the same for each thread of a thread group, or the instruction is indicated as being an external load instruction that is followed by one or more instructions that will produce the same result if the externally loaded data is the same for each thread of a thread group, but it is determined that the externally loaded data is not the same for each thread in the thread group, then the subsequent instructions are executed for each thread in the thread group individually, so as to produce a separate result for each thread of the thread group.

Where a sequence of instructions that has been executed for a thread group by executing those instructions for only a single thread of the thread group is followed by a load instruction that reverts the execution of the instructions to being done for each thread of the thread group individually, then the result of the single thread execution of the previous instructions is replicated (distributed) to the other threads of the thread group so that all the threads can use the result of that single thread execution when executing the subsequent instructions that are to be executed for each thread individually.

As will be discussed further below, in the present embodiments, the above operation is set by setting a "matching bit" indicator in state information for the thread group in question to indicate whether instructions for the thread group should be executed for all the threads in the thread group individually, or whether they should be executed for only a single thread on behalf of the whole thread group.

Figure 4:
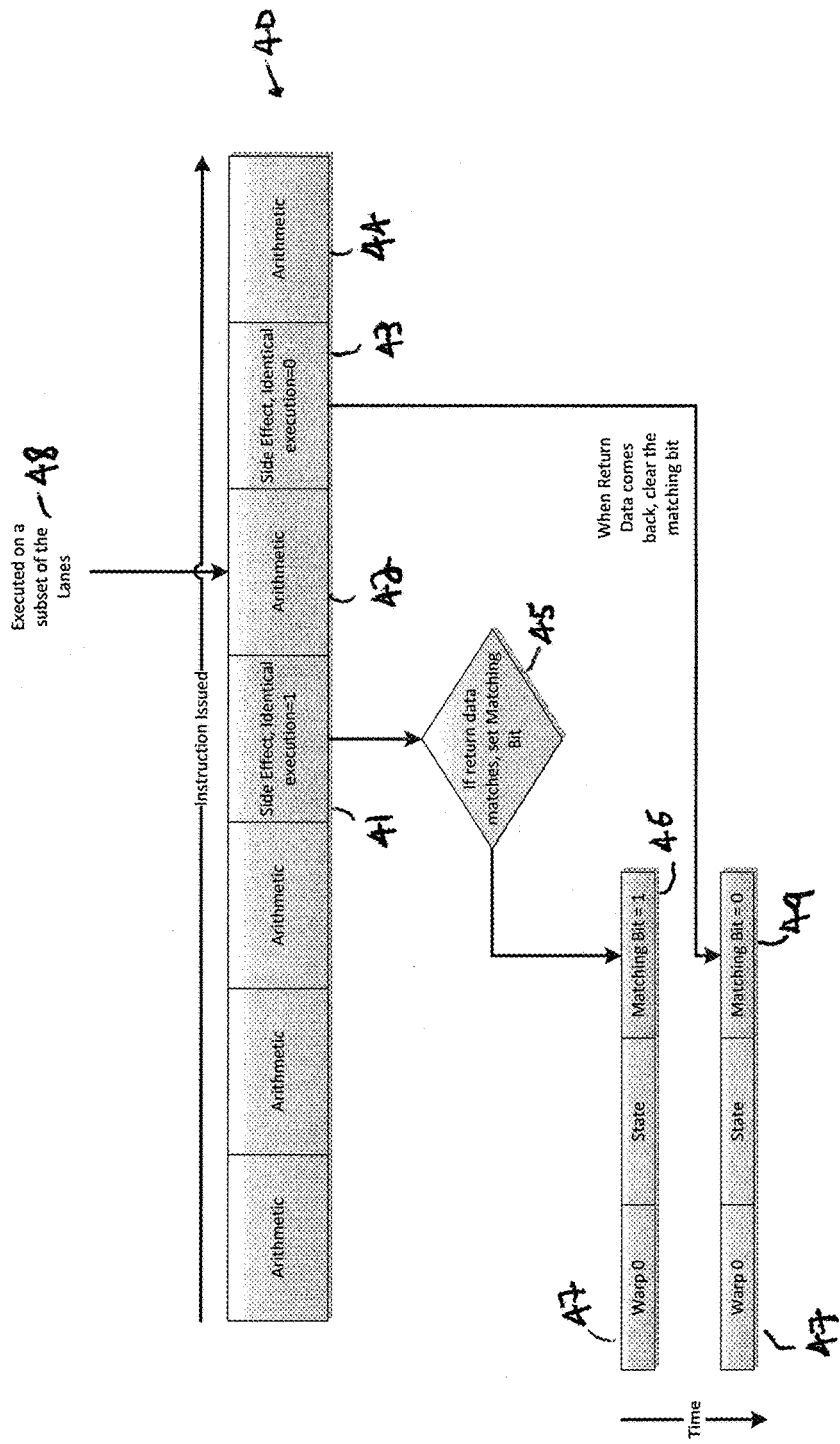
FIG. 4 shows schematically the execution of a set of instructions in an embodiment of the technology described herein.

FIG. 4 shows an example of this operation for a set of instructions 40 to be executed, in which it is assumed that the fourth instruction 41 is an external load instruction that is followed by an arithmetic instruction 42 that will produce the same result for each thread of a thread group if the load instruction 41 loads the same data for each thread in a thread group. It is also assumed that the next instruction 43 is another external load instruction, but in this case is followed by an instruction 44 that will produce a different result for each thread in a thread group, even if the data loaded by the load instruction 43 is the same for each thread in the thread group.

As shown in FIG. 4, when instruction 41 is executed, because that instruction is flagged as being followed by an instruction that will produce the same result for all threads in a thread group if the data loaded by the instruction 41 is the same for all threads in the thread group, the data that it returns for each thread of the thread group is compared to determine if it matches 45, and if that data does match, the "matching bit" indication 46 for the thread group 47 in question is set accordingly.

Then, when the instruction 42 is being executed, the "matching bit" state 46 for the thread group 47 is checked, and as that indicates that there was a data match for all the threads, the instruction 42 is executed for only a single thread of the thread group 48.

However, when the next instruction 43 is executed, then that instruction is indicated as not being followed by an instruction that will produce the same result if the loaded data values are the same for all the threads. Accordingly, when the instruction 43 is executed and the data is loaded, the "matching bit" state for the thread group 47 is updated 49 to indicate that.

Correspondingly, the result of the single thread execution of the previous instruction 42 is replicated (distributed) to the other threads of the thread group so that all the threads can use the result of that single thread execution when executing the subsequent instruction 44 that is to be executed for each thread individually.

The subsequent arithmetic instruction 44 is then executed for each thread in the thread group individually.

An exemplary program for execution by a programmable processing stage that operation in the manner of the present embodiment can be applied to is set out below:

$R0=R1+R2$ $R3=R0+R4$ $R5=\text{load·matching\_bit}(R3)$ $R6=R5+1$ $R7=\text{load}(R6)$ $R8=R7+\text{lane\_id}$ In this program Rx refers to the value in register Rx. Thus the first instruction sets the value in register R0 to the sum of the values in registers R1 and R2 (and so on).

For this sequence of instructions, it can be seen that the result of the fourth instruction (that sets register R6) will always be the same if the result of the previous load instruction for R5 is the same for each thread of a thread group. Correspondingly, the result of the next load instruction that sets R7 that uses the result of the instruction for R6 as its load address (this instruction stores the value at the memory address having the address of the value stored in register R6 into register R7) will be the same if the instruction that sets the value for R6 results in the same value in register R6 for each thread (as each thread will then read the same memory address and store its value in register R7).

Accordingly, as shown in the example instruction sequence shown above, the third instruction (the load instruction for R5) can have its associated "matching bit" set to indicate that this is a load instruction followed by a sequence of one or more instructions (namely the instructions for R6 and R7) that if the external data is the same for each thread in the thread group, will produce the same result for each thread in the thread group.

On the other hand, the final load instruction in the above example set of instructions that sets the value for the register R8 is dependent upon the execution lane ID, such that even if the external data loaded by the instruction for R7 is the same for each thread in the thread group, the result of the instruction for R8 using that external data will still differ. In this case therefore the instruction that sets the value of register R7 is not an external load instruction that is followed by one or more subsequent instructions that will produce the same result if the data loaded by the instruction that sets the value of R7 is the same for each thread of the thread group, and so the load instruction for the register R7 does not have its "matching bit" set.

Figures 5, 6:
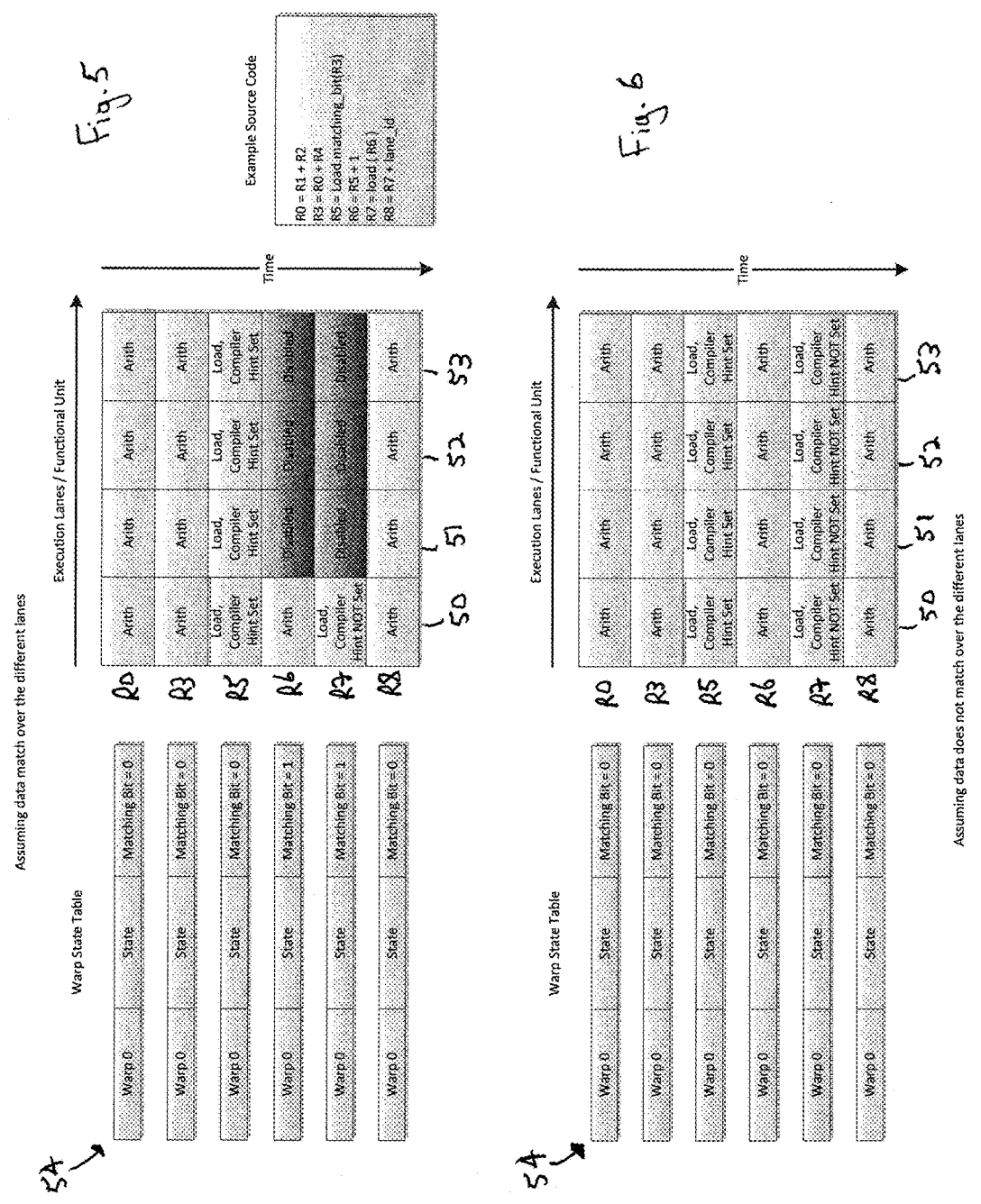

FIGS. 5 and 6 show schematically the execution of the exemplary program set out above for a thread group comprising four threads (thus being executed over four execution lanes 50, 51, 52 and 53).

FIGS. 5 and 6 also show the corresponding state setting 54 for the thread group in question as the sequence of instructions is being executed.

FIG. 5 shows the operation where the external load instruction for the register R5 in the sequence of instructions returns the same data to each thread (execution lane).

As can be seen from FIG. 5, in response to determining that the load instruction R5 has returned the same data, the matching bit state of the thread group is updated 55 to indicate that the subsequent instruction can be executed using a single thread only, and the instructions for R6 and R7 are correspondingly, as shown in FIG. 5, executed for one thread (execution lane) 50 only. The other threads (execution lanes) 51, 52 and 53 are, as shown in FIG. 5, disabled.

However, when the next external load instruction for register R7 is executed, because that instruction is not indicated as being a potential "matching" instruction, the "matching bit" indication 56 is cleared to indicate that the subsequent instructions should be executed for each thread (execution lane) individually. Correspondingly, as shown in FIG. 5, the instruction for register R8 is executed for each thread (execution lane) 50, 51, 52 and 53 individually.

FIG. 6 shows the corresponding operation but in the situation where the data loaded by the instruction for register R5 is different for each thread (execution lane). In that case, as shown in FIG. 6, the "matching bit" state information for the thread group following the execution of the load instruction for register R5 is not set to indicate that the subsequent instructions for registers R6 and R7 should be executed singly for the group of threads, but instead is set to indicate that the subsequent instructions must still be executed for each thread individually. Accordingly, as shown in FIG. 6, the subsequent instructions for registers R6 and R7 are, unlike in FIG. 5, executed for each thread (execution lane) 50, 51, 52 and 53 individually.

Figure 7:
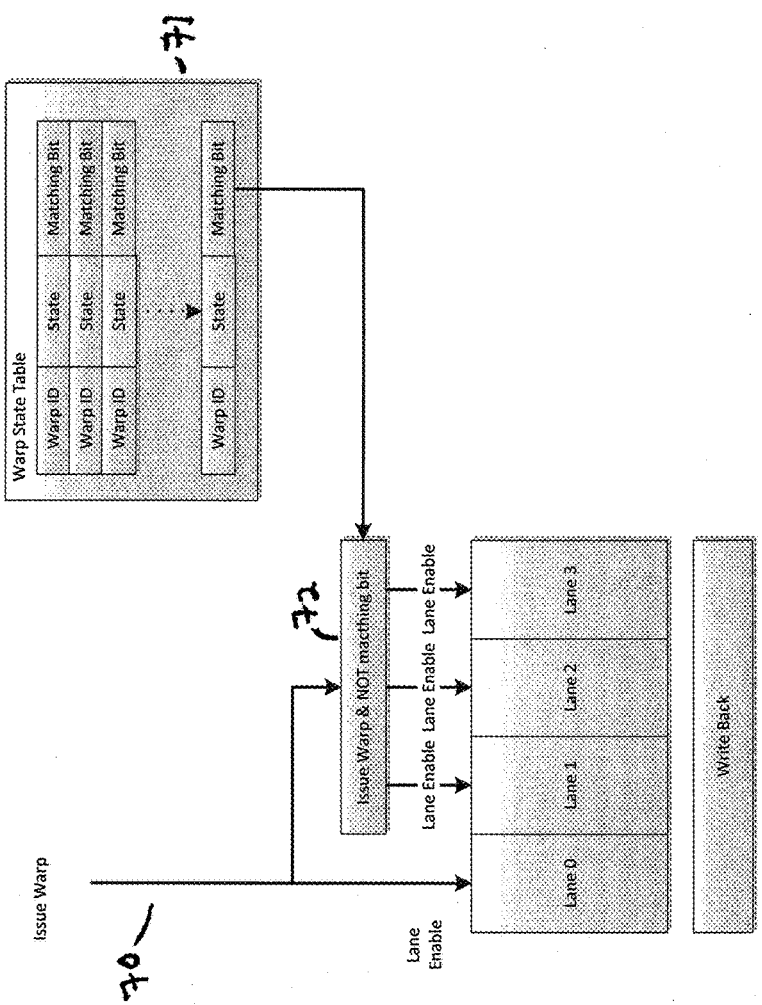
FIG. 7 shows schematically the issue of instructions for execution by a thread group in an embodiment of the technology described herein.

FIG. 7 shows schematically the issuing of instructions for execution by a thread group (warp) and the use of the appropriate matching bit state information in the thread group (warp) state information to control the enabling or disabling of the thread group execution lanes.

As shown in FIG. 7, each time an instruction 70 is issued for execution by a thread group (warp), the "matching bit" information in the warp state table 71 for the thread group (warp) in question is checked to determine whether to enable 72 the additional execution lanes for the thread group in question or not.

Figure 8:
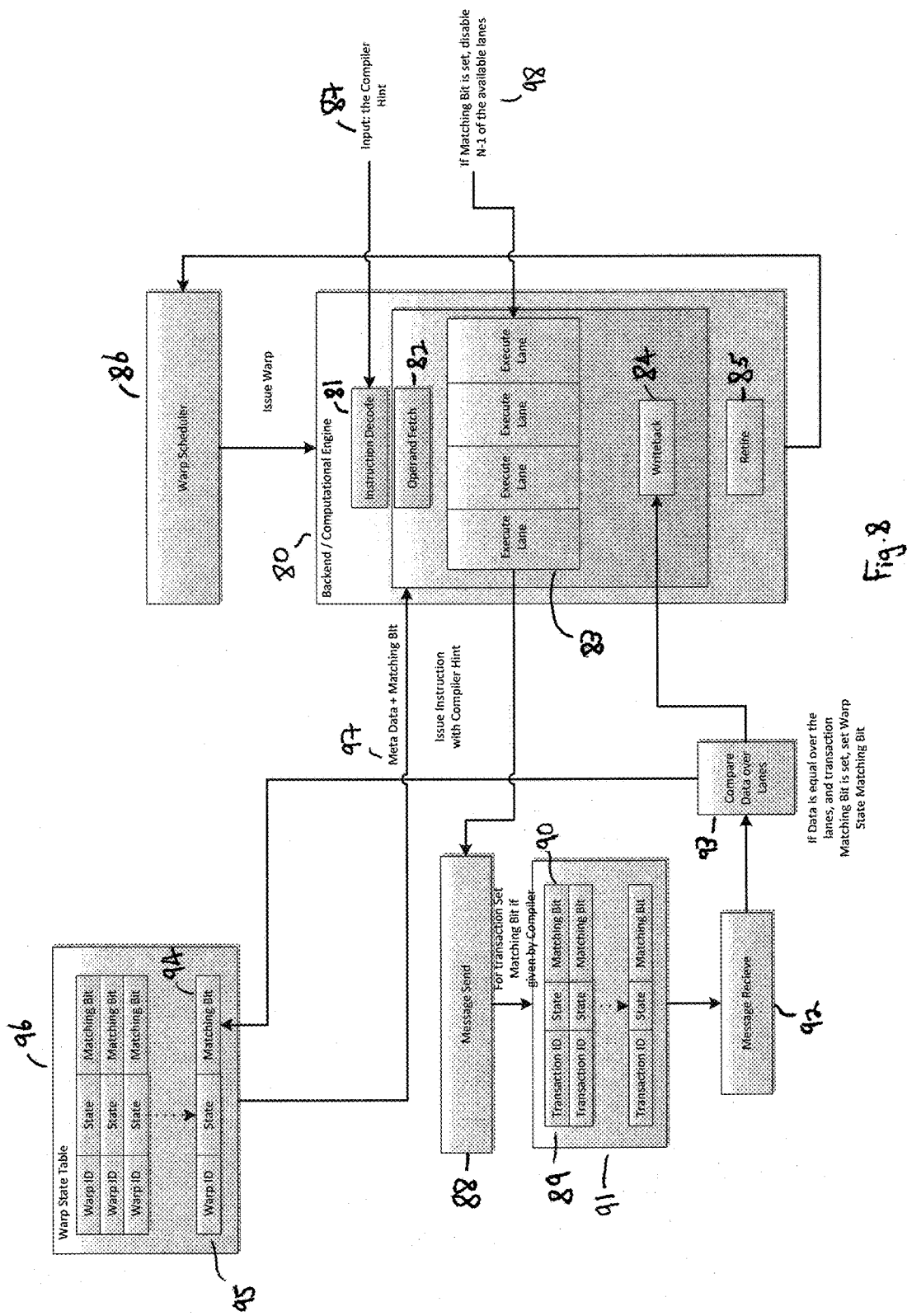
FIG. 8 shows schematically the process and exchange of messages when executing a set of instructions for a thread group in an embodiment of the technology described herein.

FIG. 8 shows schematically the process and exchange of messages in an embodiment of the technology described herein when executing a set of instructions for a thread group.

As shown in FIG. 8, a computation engine 80 of a programmable processing stage of a data processor includes instruction decode circuitry 81 that decodes instructions for execution by execution threads, operand fetch circuitry 82 that is operable to fetch data in response to load instructions, and a plurality of execution lanes 83, one for each execution thread of a thread group. The execution lanes 83 include, for example, appropriate execution (e.g. arithmetic) circuitry for performing processing operations for execution threads.

The computation engine 80 also includes write-back circuitry 84 that is operable to write data back to registers for respective execution lanes 83, and thread group retire circuitry 85 that is operable to retire a thread group once its processing has been completed, and to indicate such retirement to a thread group (warp) scheduler 86 that is operable to issue thread groups to the computation engine 80 for execution.

As shown in FIG. 8, when the instruction decode circuitry 81 receives a load instruction, then that instruction is issued to the execution lanes which correspondingly send a message 88 to an external load unit (not shown). The message 88 will return 92 the data from the external source which can then be written 84 to appropriate registers for each execution thread (execution lane) 83.

As shown in FIG. 8, a record is also kept for each "load" message that has been sent in a transaction state table 91, indicating 90 whether the load message in question is from an instruction that is followed by a sequence of instructions that will produce the same result if the same data value is returned for each thread in a thread group.

Accordingly, as shown in FIG. 8, if the instruction decode circuitry 81 receives a load instruction with an associated indication 87 that it is followed by a sequence of instructions that will produce the same result if the same data value is returned for each thread in a thread group, then that instruction is issued to the execution lanes which correspondingly send a message 88 to an external load unit (not shown). The "matching bit" 90 is also set appropriately for the load transaction 89 in question in the transaction state table 91. When the results of the load message are returned 92, the data returned for each thread is compared 93 to determine if it equal or not, and also written 84 to appropriate registers for each execution thread (execution lane) 83.

Furthermore, if the returned data is the same for each execution thread and the load transaction in question had its "matching bit" set, the corresponding warp state matching bit 94 is set accordingly for the thread group 95 in question in a warp state table 96.

Then, when the next instruction is to be executed for that thread group 95, as shown in FIG. 8, the matching bit for the thread group 95 in the warp state table 96 is checked 97 and if that bit is set, then all but one of the execution lanes 83 is disabled 98 for the instruction in question.

This is then repeated for each subsequent instruction until another external load instruction is encountered, in which case the process of fetching the data and updating the matching bit state for the thread group is performed.

Figure 9:
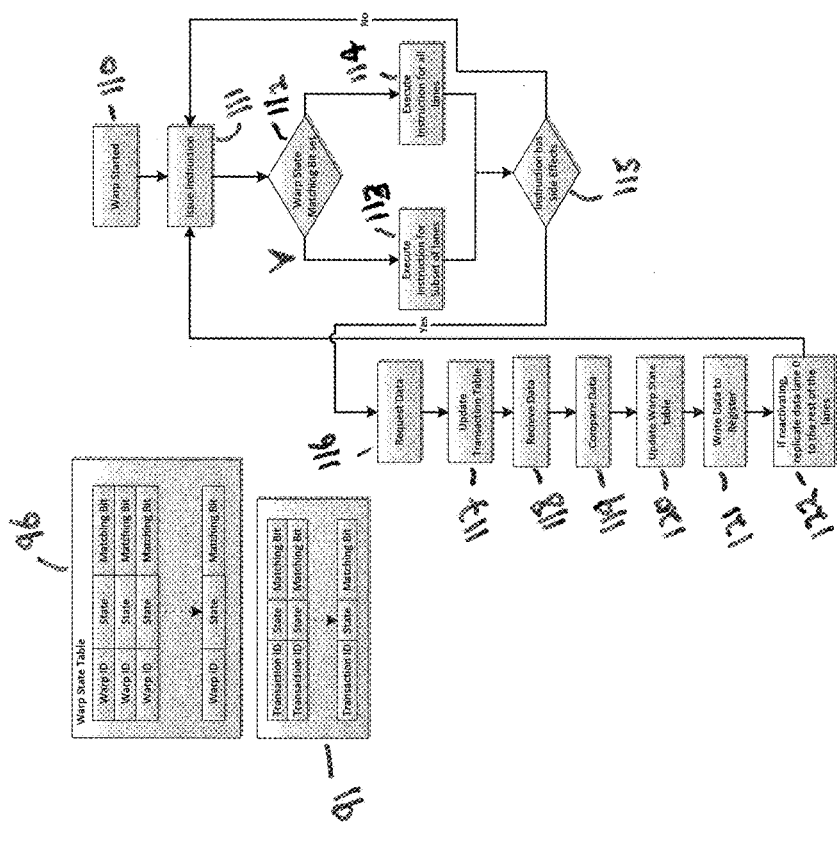
FIG. 9 is a flow chart illustrating the operation shown in FIG. 8.

FIG. 9 is a flow chart illustrating the above operation shown in FIG. 8.

As shown in FIG. 9, when a new thread group (warp) is started (step 110) the warp scheduler will issue successive instructions for execution by the thread group (step 111). When each instruction is issued, the current warp state matching bit in the warp state table 96 will be checked (step 112). If the matching bit is set, the instruction will be executed for a subset of the threads in the thread group (warp) (step 113). On the other hand, if the matching bit is not set for the thread group (warp), then the instruction will be executed for all threads (execution lanes) in the thread group (step 114).

It will then be determined if the instruction is an external load instruction (has side effects) (step 115).

If the instruction is not an external load instruction then the next instruction is issued (step 111).

On the other hand, if the current instruction is an external load instruction, then a message is issued to request the relevant data (step 116) and the load message transaction table 91 is updated appropriately (step 117), including setting the "matching bit" state for the load request transaction in question, according to whether that instruction is flagged as being followed by one or more instructions that will produce the same result data if the externally loaded data is the same for each thread in the thread group or not.

Then, when the external data is received (step 118), it is compared to determine if it is the same for each thread (step 119) and the thread group (warp) state table 96 is updated for the thread group (warp) in question accordingly (step 120).

The fetched data is then written to the register(s) for the active threads of the thread group (step 121), and if necessary the data from a single thread is replicated (distributed) to the remaining threads of the thread group (step 122) (namely in the event where the previous instruction has been executed for only a single thread (a subset of the execution lanes) for the whole thread group (warp)).

The next instruction is then issued (step 111) and the process repeated for that instruction.

This operation is repeated for each instruction, until all the instructions in the set of instructions are executed for the thread group in question.

Figure 10:
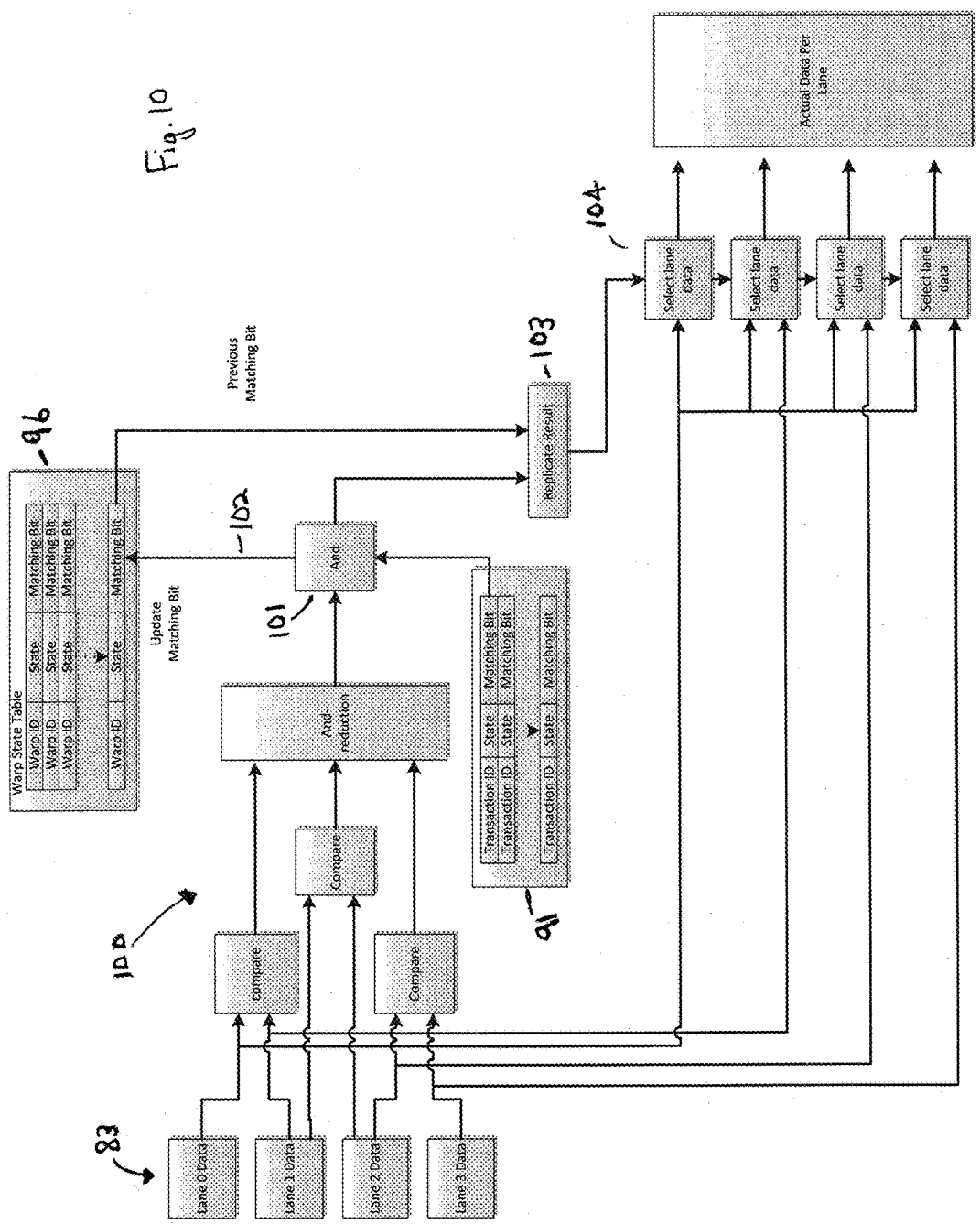
FIG. 10 shows the comparison of the data for respective threads in a thread group in an embodiment of the technology described herein.

FIG. 10 shows the comparison of the data for respective threads in a thread group and the use of that to update the various state tables and load data for execution threads in more detail.

As shown in FIG. 10, in order to compare the returned data for the respective execution lanes 83, comparison circuitry 100 is used to compare respective pairs of data values to obtain an overall comparison result that will indicate whether all the data values were the same or not.

That comparison result is then subjected to an AND operation 101 with the matching bit data for the load instruction in question from the transaction state table 91. The result of this AND operation will indicate therefore whether the subsequent instructions can be executed for a single thread of the thread group or should be executed for each thread of the thread group individually.

Accordingly, as shown in FIG. 10, the result of this operation is used to update 102 the matching bit state for the thread group in question in the warp (thread group) state table 96.

It is also used in combination with the previous matching bit state for the thread group in question to determine 103 whether the data for a previously executed single thread for the thread group should now be replicated (distributed) to each of the threads in the thread group (in the case where the threads are now all to be executed individually for the thread group).

The result of this process, together with the fetched data for each execution lane is then appropriately selected 104 and loaded into registers for use by each respective execution lane (execution thread) 83.

Figure 11:
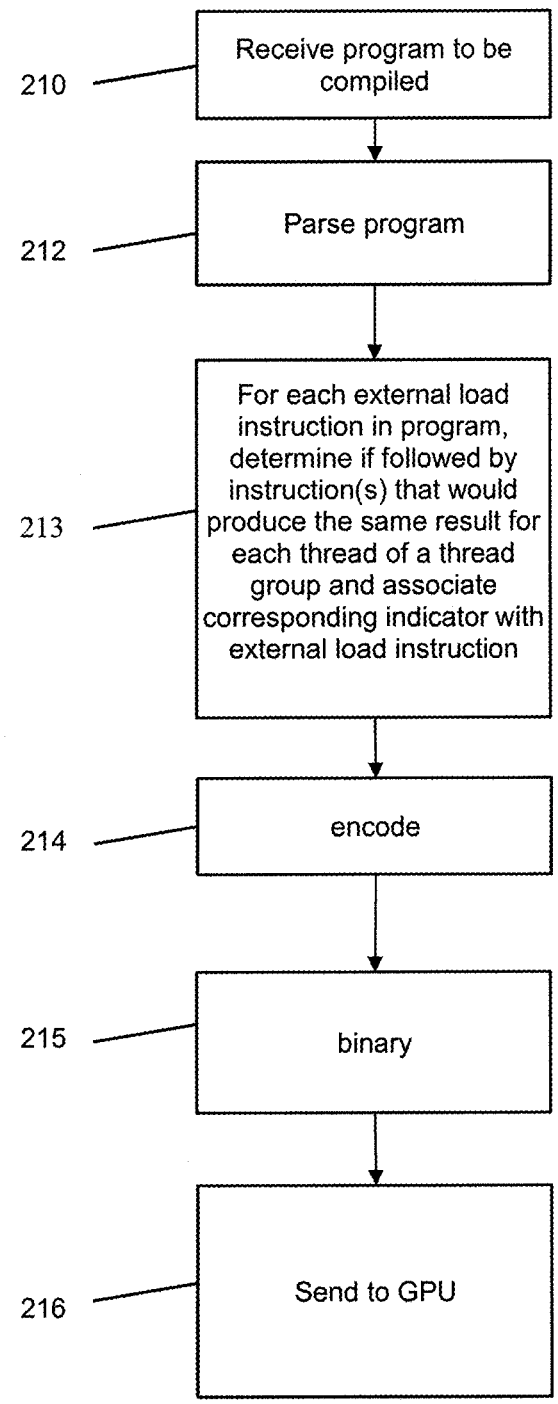
FIG. 11 shows schematically the compiler operation in an embodiment of the technology described herein.

FIG. 11 shows schematically the corresponding compiler operation for flagging external load instructions in a shader program to be executed as being followed (or not) by one or more instructions that if the loaded external data is the same for each thread of a thread group, will then produce the same result for each thread of a thread group.

As shown in FIG. 11, the compiler receives the fragment shader program in the high level source language 210, and parses 212 that program.

As part of this operation, it identifies any program instructions that will load external data, and when such an instruction is identified, analyses the subsequent instructions to determine whether they are instructions that would produce the same result for all threads of a thread group if the externally loaded data is the same for all the threads of the thread group or not. The compiler then flags the load instruction accordingly. (Step 213.)

This is done for each load instruction in the program to be executed (that is being compiled).

The so-processed program is then encoded 214 into the appropriate binary code 215 for the graphics processing pipeline and sent 216 to the graphics processing pipeline (graphics processing unit (GPU)) for execution.

Although the technology described herein has been described above with particular reference to a graphics processor and graphics processing pipelines, as will be appreciated by those skilled in the art, the technology described herein can be used in any form of data processing system and data processing pipeline where execution threads may be executed in thread groups, such as, for example, in SIMD (Single Instruction Multiple Data) machines more generally.

As can be seen from the above, the technology described herein, in its embodiments at least, facilitates execution lane disabling in programmable processing stages of data processing systems when the input data to the functional units is the same, but without the need to use comparators and register accesses at every instruction issue, thereby improving power consumption and timing, etc.

This is achieved, in the embodiments of the technology described herein at least, by identifying external load instructions that provide a potential opportunity for execution lane disabling, and comparing data values using comparators when the load instruction data is returned, rather than, e.g., at every instruction issue.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a data processing system which includes a programmable processing stage that executes instructions to perform processing operations, in which execution threads may be grouped together into thread groups in which the plural threads of a thread group can each execute a set of instructions in lockstep, one instruction at a time;

the method comprising:

for a program comprising a set of instructions for execution by a programmable processing stage of the data processing system:

for an instruction in the set of instructions that will obtain external input data from a source that is external to the programmable processing stage:

determining whether the instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data; and when it is determined that an instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data:

associating with the instruction that will obtain external input data from a source that is external to the programmable processing stage an indication that it is followed by is followed by one or more subsequent instructions that will use the external data and that would produce the same result for plural threads of a thread group were those plural threads each to execute the one or more subsequent instructions using the same external input data;

the method further comprising:

the programmable processing stage:

receiving the set of instructions for execution by the programmable processing stage; and executing the set of instructions for a thread group comprising plural execution threads;

the executing the set of instructions for the thread group comprising:

for an instruction that will obtain external input data from a source that is external to the programmable processing stage:

executing the instruction for each thread of the thread group to obtain external input data for each thread of the thread group;

determining whether the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data; and determining whether the obtained external input data is the same for plural threads of the thread group; and when it is determined that the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is not the same for plural threads of the thread group:
  executing the one or more subsequent instructions that will use the external data and that would produce the same result for plural threads of a thread group were those plural threads each to execute the one or more subsequent instructions using the same external input data, for each of the plural threads of the thread group individually;
when it is determined the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is the same for plural threads of the thread group:
  executing the one or more subsequent instructions that will use the external data and that would produce the same result for plural threads of a thread group were those plural threads each to execute the one or more subsequent instructions using the same external input data, for only a single thread of the plural threads.

2. The method of claim 1, wherein the data processing system is a graphics processing system, and the programmable processing stage is a shader of the graphics processing system.

3. The method of claim 1, wherein the indication of an external load instruction that is followed by one or more subsequent instructions that will use the external data and that would produce the same result for plural threads of a thread group were those plural threads each to execute the one or more subsequent instructions using the same external input data is provided by a flag associated with the instruction.

4. The method of claim 1, further comprising:
when it is determined that an instruction that will obtain external input data from a source that is external to the programmable processing stage is not followed by one or more subsequent instructions that will use the external data and that would produce the same result for plural threads of a thread group were those plural threads each to execute the one or more subsequent instructions using the same external input data:
  associating with the instruction that will obtain external input data from a source that is external to the programmable processing stage an indication that it is followed by is followed by one or more subsequent instructions that will use the external data and that may not produce the same result for plural threads of a thread group were those plural threads each to execute the one or more subsequent instructions using the same external input data.

5. The method of claim 1, further comprising:
the programmable processing stage when it is determined that an instruction that will obtain external input data from a source that is external to the programmable processing stage does not have associated with it an indication that it is followed by one or more subsequent instructions that will use the external data and that would produce the same result for plural threads of a thread group were those plural threads each to execute the one or more subsequent instructions using the same external input data:
  executing the one or more subsequent instructions that will use the external data for each of the plural threads of the thread group individually.

6. The method of claim 1, further comprising:
the programmable processing stage, when it has executed one or more instructions that will use external data for only a single thread of plural threads of a thread group, distributing the result of the single thread that executed the one or more subsequent instructions to each of the plural threads in the thread group, so that those plural threads can then use the result of the execution of the one or more subsequent instructions for further instruction execution.

7. The method of claim 1, further comprising:
the programmable processing stage, when it has executed one or more instructions that will use external data for only a single thread of plural threads of a thread group, for the next instruction in the set of instructions that will obtain external input data from a source that is external to the programmable processing stage:
determining whether that instruction that will obtain external input data from a source that is external to the programmable processing stage has associated with it an indication that is followed by one or more subsequent instructions that will use the external data and that would produce the same result for plural threads of a thread group were those plural threads each to execute the one or more subsequent instructions using the same external input data; and
when it is determined that the instruction that will obtain external input data from a source that is external to the programmable processing stage does not have associated with it an indication that is followed by one or more subsequent instructions that will use the external data and that would produce the same result for plural threads of a thread group were those plural threads each to execute the one or more subsequent instructions using the same external input data:
  providing the result of the execution of the one or more instructions for only a single thread of the plural threads to the plural threads of the thread group; and
executing the one or more subsequent instructions that will use the external data for each of the threads of the thread group individually, using the result from the execution of the single thread.

8. The method of claim 1, further comprising the programmable processing stage, each time it encounters an instruction that will obtain external input data from a source that is external to the programmable processing stage in the set of instructions being executed for a thread group, determining whether that instruction has associated with it an indication that it is followed by one or more subsequent instructions that will use the external data and that would produce the same result for plural threads of a thread group were those plural threads each to execute the one or more subsequent instructions using the same external input data or not.

9. The method of claim 1, further comprising associating with a thread group that is being executed metadata that indicates whether the thread group should execute instructions separately for the threads of the thread group, or should execute instructions for only a single thread of the thread group.

10. A data processing system, comprising:
a programmable processing stage comprising processing circuitry that executes instructions to perform processing operations, in which execution threads may be grouped together into thread groups in which the plural threads of a thread group can each execute a set of instructions in lockstep, one instruction at a time;
the data processing system further comprising:
processing circuitry configured to, for a program comprising a set of instructions for execution by the programmable processing stage of the data processing system:
identify an instruction in the set of instructions that will obtain external input data from a source that is external to the programmable processing stage; and
determine whether the instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data; and
when it is determined that an instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data:
associate with the instruction that will obtain external input data from a source that is external to the programmable processing stage an indication that it is followed by is followed by one or more subsequent instructions that will use the external data and that would produce the same result for plural threads of a thread group were those plural threads each to execute the one or more subsequent instructions using the same external input data;
and the programmable processing stage further comprising processing circuitry configured to:
receive a set of instructions for execution by the programmable processing stage; and
execute the set of instructions for a thread group comprising plural execution threads;
the executing the set of instructions for the thread group comprising:
for an instruction that will obtain external input data from a source that is external to the programmable processing stage:
executing the instruction for each thread of the thread group to obtain external input data for each thread of the thread group;
determining whether the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data; and
determining whether the obtained external input data is the same for plural threads of the thread group; and
when it is determined that the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is not the same for plural threads of the thread group:
executing the one or more subsequent instructions that will use the external data and that would produce the same result for plural threads of a thread group were those plural threads each to execute the one or more subsequent instructions using the same external input data, for each of the plural threads of the thread group individually;
when it is determined the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is the same for plural threads of the thread group:
executing the one or more subsequent instructions that will use the external data and that would produce the same result for plural threads of a thread group were those plural threads each to execute the one or more subsequent instructions using the same external input data, for only a single thread of the plural threads.

11. The system of claim 10, wherein the data processing system is a graphics processing system, and the programmable processing stage is a shader of the graphics processing system.

12. The system of claim 10, wherein the indication of an external load instruction that is followed by one or more subsequent instructions that will use the external data and that would produce the same result for plural threads of a thread group were those plural threads each to execute the one or more subsequent instructions using the same external input data is provided by a flag associated with the instruction.

13. The system of claim 10, wherein the processing circuitry is further configured to:
when it is determined that an instruction that will obtain external input data from a source that is external to the programmable processing stage is not followed by one or more subsequent instructions that will use the external data and that would produce the same result for plural threads of a thread group were those plural threads each to execute the one or more subsequent instructions using the same external input data:
associate with the instruction that will obtain external input data from a source that is external to the programmable processing stage an indication that it is followed by is followed by one or more subsequent instructions that will use the external data and that may not produce the same result for plural threads of a thread group were those plural threads each to execute the one or more subsequent instructions using the same external input data.

14. The system of claim 10, wherein the programmable processing stage processing circuitry is further configured to:
when it is determined that an instruction that will obtain external input data from a source that is external to the programmable processing stage does not have associated with it an indication that it is followed by one or more subsequent instructions that will use the external data and that would produce the same result for plural threads of a thread group were those plural threads each to execute the one or more subsequent instructions using the same external input data:
execute the one or more subsequent instructions that will use the external data for each of the plural threads of the thread group individually.

15. The system of claim 10, wherein the programmable processing stage processing circuitry is further configured to:
when one or more instructions that will use external data have been executed for only a single thread of plural threads of a thread group, distribute the result of the single thread that executed the one or more subsequent instructions to each of the plural threads in the thread group, so that those plural threads can then use the result of the execution of the one or more subsequent instructions for further instruction execution.

16. The system of claim 10, wherein the programmable processing stage processing circuitry is further configured to:
when one or more instructions that will use external data have been executed for only a single thread of plural threads of a thread group, for the next instruction in the set of instructions that will obtain external input data from a source that is external to the programmable processing stage:
determine whether that instruction that will obtain external input data from a source that is external to the programmable processing stage has associated with it an indication that is followed by one or more subsequent instructions that will use the external data and that would produce the same result for plural threads of a thread group were those plural threads each to execute the one or more subsequent instructions using the same external input data; and
when it is determined that the instruction that will obtain external input data from a source that is external to the programmable processing stage does not have associated with it an indication that is followed by one or more subsequent instructions that will use the external data and that would produce the same result for plural threads of a thread group were those plural threads each to execute the one or more subsequent instructions using the same external input data:
provide the result of the execution of the one or more instructions for only a single thread of the plural threads to the plural threads of the thread group; and
execute the one or more subsequent instructions that will use the external data for each of the threads of the thread group individually, using the result from the execution of the single thread.

17. The system of claim 10, wherein the programmable processing stage processing circuitry is further configured to:
associate with a thread group that is being executed metadata that indicates whether the thread group should execute instructions separately for the threads of the thread group, or should execute instructions for only a single thread of the thread group.

18. A non-transitory computer readable storage medium storing computer software code which when executing on a processor performs a method of operating a data processing system which includes a programmable processing stage that executes instructions to perform processing operations, in which execution threads may be grouped together into thread groups in which the plural threads of a thread group can each execute a set of instructions in lockstep, one instruction at a time;
the method comprising:
for a program comprising a set of instructions for execution by a programmable processing stage of the data processing system:
for an instruction in the set of instructions that will obtain external input data from a source that is external to the programmable processing stage:
determining whether the instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data; and
when it is determined that an instruction that will obtain external input data from a source that is external to the programmable processing stage is followed by one or more subsequent instructions that will use the external data and that would produce the same result for plural threads of a thread group were those plural threads each to execute the one or more subsequent instructions using the same external input data:
associating with the instruction that will obtain external input data from a source that is external to the programmable processing stage an indication that it is followed by is followed by one or more subsequent instructions that will use the external data and that would produce the same result for plural threads of a thread group were those plural threads each to execute the one or more subsequent instructions using the same external input data;
the method further comprising:
the programmable processing stage:
receiving the set of instructions for execution by the programmable processing stage; and
executing the set of instructions for a thread group comprising plural execution threads;
the executing the set of instructions for the thread group comprising:
for an instruction that will obtain external input data from a source that is external to the programmable processing stage:
executing the instruction for each thread of the thread group to obtain external input data for each thread of the thread group;
determining whether the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data; and determining whether the obtained external input data is the same for plural threads of the thread group; and when it is determined that the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is not the same for plural threads of the thread group:

executing the one or more subsequent instructions that will use the external data and that would produce the same result for plural threads of a thread group were those plural threads each to execute the one or more subsequent instructions using the same external input data, for each of the plural threads of the thread group individually;

when it is determined the instruction that will obtain external input data from a source that is external to the programmable processing stage has associated with it an indication that it is followed by one or more subsequent instructions that will use the external data and that would produce the same result for plural threads of a thread group were those plural threads each to execute the one or more subsequent instructions using the same external input data, and it is determined that the external input data is the same for plural threads of the thread group:

executing the one or more subsequent instructions that will use the external data and that would produce the same result for plural threads of a thread group were those plural threads each to execute the one or more subsequent instructions using the same external input data, for only a single thread of the plural threads.

* * * * *